United States Patent Office 3,351,491
Patented Nov. 7, 1967

3,351,491
METHOD OF MAKING SOLID ELECTROLYTE MATERIAL
Bryan Sidney Harris and Anthony Desmond Shand Tantram, Dorking, Surrey, England, assignors to National Research Development Corporation, London, England, a corporation of Great Britain
No Drawing. Filed Feb. 14, 1963, Ser. No. 258,628
Claims priority, application Great Britain, Feb. 21, 1962, 6,788/62
9 Claims. (Cl. 136—86)

This invention relates to fuel cells, that is to say electrochemical cells wherein the free energy of combustion of a fuel is converted directly into electrical energy.

The invention is particularly concerned with fuel cells wherein the electrolyte is of the so-called "semi-solid" type, sometimes referred to as "semi-paste" type. British patent No. 806,592 discloses an electrolyte comprising a mixture of alkali metal carbonates of which the properties are such that, at temperatures below the working temperatures of the cell, the electrolyte can be completely solid, yet, at the working temperatures, it has the form of a solid matrix carrying liquid electrolyte in its interstices. An alternative proposal has been made to include in the electrolyte an inert filler material, which material, at the working temperatures, acts to provide a skeletal support for the electrolyte which, although solid at lower temperatures, is liquid at the working temperatures of the cell.

The advantage of this type of electrolyte is that it can be formed to shape and handled as a component part in fabricating a cell, and the electrolyte does not have to be introduced after assembly of the electrodes and other components of the cell. An obvious method of pre-forming such an electrolyte component involves fusion of the whole electrolyte and casting into moulds; but at higher temperatures, when completely molten, these electrolytes are even more corrosive than at working temperatures, and it becomes difficult to provide mould materials at reasonable costs. It has been proposed to reduce the moulding temperature by using what is called a "hot-pressing" operation at temperatures below the fusion point of the matrix or filler material but above the melting point of the electrolyte proper, in which state the mix, although not by any means as mobile as when being cast from the wholly molten state, has a certain degree of fluidity under pressure. It is found to be impossible however by this hot-pressing operation to produce pre-formed electrolyte shapes having uniform density and even then, the maximum density attainable appears to be only about ninety percent, varying, with different materials and conditions, down even to seventy percent, of the theoretical density.

It is imperative for fuel cell use that the electrolyte should be impermeable to gases and, in consequence, a high degree of gas-tightness of the electrolyte must be achieved. It is necessary, therefore, that densities of at least ninety-five percent of the theoretical should be attained, and it is apparent that this prior, fluid-state, pressing proposal is not practicable. In any case, it is found that even at those hot-pressing temperatures, difficulties arise due to extrusion of the liquid phases of the electrolyte between plungers and the mould, to sticking of the moulded piece to the mould, and, also, although on a reduced scale, to corrosion.

It has now been discovered, unexpectedly, that electrolyte forms having adequate densities can be produced by hot-pressing at temperatures below even the melting point of the electrolyte proper, with considerable advantages.

According to the invention, therefore, an electrolyte of the semi-solid type, prepared in powder form, is pressed to shape at a consolidation temperature which is below that at which it is fluid or below that at which there is a liquid phase present in the electrolyte. Preferably the temperature at which pressing takes place is near the temperature of melting of the electrolyte, or of said liquid phase, say, within 20°–30° C.

Electrolyte materials which appear to be particularly suitable are (a) a material containing about 50% mixed sodium carbonate and lithium carbonate in substantially equi-molar proportion with 50%, or thereabouts, magnesium oxide, which material can be pressed successfully at about 480° C., (the melting point of the equi-molar carbonate constituent being about 500° C.), (b) a material of the same constituents but of composition approximating to 36.5% said equi-molar carbonate mixture and 63.5% magnesium oxide, which material can also be pressed at about 480° C., the consolidation at this temperature also yielding adequate gas-tightness, and (c) a material comprising magnesium oxide with a mixture of sodium carbonate, lithium carbonate and potassium carbonate, it appearing that the proportion of magnesium oxide should be between 75% and 40% by weight and preferably near 65% (the melting point of the mixed carbonates constituent being about 370° C. if of eutectic composition and the pressing temperature in that case being about 400° C.). Magnesium oxide is selected for the inert filler material because of its low density and because of its relative cheapness, but other fillers may be used. It would appear that similar limitations on the quantity of any other filler present should be made, and may be expressed as being between 65% by volume and 30% by volume, whatever the filler material, the lower limit being associated with the strength of the material at the operating temperature of the cell, smaller quantities of filler not being sufficient to prevent distortion of the pressing when under load. The introduction of filler to the electrolyte raises the internal resistance of the electrolyte body but a point is reached, as it happens over quite a small increase of filler content, where the electrolyte body assumes a porous character and such a limit would be crucial to satisfactory operation of a cell incorporating such electrolyte material, even if the internal resistance of the electrolyte body were not too high at a lower proportion of filler. It is necessary that the filler should be inert to the electrolyte used and that it should be an insulator. Zinc oxide is possible, but its use is limited to working below about 550° C., because above that temperature its electronic conductivity becomes too great; other possible fillers are alumina, zirconia and thoria.

In one particular example of use of the material referred to at (a) above, in accordance with the invention, the ingredients, of which the magnesium oxide is in the form known as "light magnesium oxide," are treated in the form of powders for removal of moisture and are then thoroughly mixed in the proportions of 29.5% sodium carbonate, 20.5% lithium carbonate and 50% magnesium oxide for two to four hours in an alumina ball-mill. Best results appear to accrue from the use of ingredients of small particle size—say less than one micron average particle size. The mixture is then loosely packed into an alumina vessel and fired at 700° C. for approximately two hours to form the electrolyte eutectic, sodium carbonate-lithium carbonate, as well as to ensure intimate wetting of the magnesia particles, care being taken here and hereafter to minimise pick-up of impurities which can contaminate the material.

In this case, if the fired material is crushed to pass a 20 B.S. sieve it will be found that this powdered material is free flowing and suitable for even filling of mould dies prior to the pressing operation. The actual distribution of sizes of particles of the powder is not critical.

In order to ensure ease of removal of the pressing from the die, which may be machined from mild steel but preferably from some harder material, the die parts are painted with a dispersion of colloidal graphite in alcohol, the graphite at the same time serving as a die lubricant and to protect all parts from oxidation in the moulding process.

As in normal powedr pressing operations, the appropriate amount of material is placed in the mould and suitably distributed so as to avoid serious variation of compaction, and pressure is applied. While cold, a pre-pressing operation may be carried out according to which the pressure is slowly raised, over a period of about two minutes, up to 2 t.s.i. principally to remove air from the material; pressure is then released. Such pre-pressing may, however, not be necessary. The die-assembly is now heated to about 480° C. and held constant for thirty minutes to reduce temperature gradients within the pressing.

After this soaking period, pressure is slowly applied once again, reaching 4 t.s.i. after about two minutes and this pressure is held for five minutes. The pressure is then released and it is arranged that the pressing is ejected as soon as possible, it being thereafter cooled slowly, care being taken to avoid severe thermal shock. Rapidity of ejection is desirable to avoid difficulties arising from differential thermal contraction between the die material and the pressing, and will be even more essential when the pressing is of complex shape.

Although the moulding process described immediately above is a somewhat lengthy one, it can be readily adapted to rapid automatic pressing or stamping methods, and it is to be understood that the scope of this invention is not to be considered as being limited to the stage-by-stage process of the kind which has been set out in detail. It is also to be understood that the electrolyte material may be subjected to other, additional or alternative, preparative processing before the hot-pressing operation in accordance with the invention. Thus, for instance, a form may be cold-fashioned and pre-sintered to give a porous biscuit-fired block which may then be hot-pressed in accordance with the invention to give an impervious body.

Similar methods will apply whatever the composition of the material. It would appear that the material refererd to under item (b) above would in fact be preferable in use to the material (a).

It is possible, using the techniques according to the invention, to incorporate electrode supports, such as metallic gauzes, and also gaskets for use in sealing one electrolyte block to another in an assembly of cells to form a battery, at the same time in one moulding operation. For this purpose, these components may be introduced by sticking them to the appropriate faces of die parts using a readily distillable adhesive (such as poly-methyl methacrylate cement) before introducing the electrolyte material into the mould. Alternatively it is possible that they may be introduced after a pre-pressing operation.

It is also possible to apply the electrodes themselves to an electrolyte block in the one operation, but care has to be taken that the porous character of the electrodes is not affected too greatly by any pressing operation to which they are subjected. Alternatively, of course, the electrodes may be applied by any suitable method at a later stage.

It has been found that cells giving little trouble in manufacture using the techniques according to the invention, may be made up from electrolyte blocks composed of 50% sodium carbonate-lithium carbonate/50% magnesium oxide material above described and each formed in the manner disclosed, as a disc of 2½ ins. diameter and about ¼ in. thick, with central cavities on opposite faces about 2 ins. diameter, so that the thickness at the cavitied portion is about 1/16 in. To assist in release from the die, the rim of each cavity is formed as a bevel about 45°. Silver gauzes of 18 mesh, preferably with bevels matching the cavities are applied to the cavities in the manner above described; and bevelled silver gaskets of 0.003 in. thickness are similarly applied to the opposite sides of the thicker rim portion; electrodes are applied in paste form on to the gauzes in a manner which is known to those skilled in the art. Cells and batteries may be made up by clamping such blocks in series, with intervening membranes if desired, and providing facilities for the supply of oxidising and fuel gases to respective chambers so formed. The art disclosed in Belgian Patent No. 604,359 may be used in the design of a suitable cell or battery.

We claim:

1. A method of preparing a molded electrolyte body of the semi-solid type for a fuel cell having a density at least 95% of theoretical in which molding of the electrolyte body is performed at a temperature below that at which any liquid phase would be present in the electrolyte body which comprises:
   (A) providing a first powder of electrolyte material selected from the group consisting of alkali metal salts and alkaline earth metal salts,
   (B) providing a second powder of inert filler selected from the group consisting of magnesium oxide, zinc oxide, alumina, zirconia and thoria,
   (C) forming a mixture of said first and second powders containing between 30 to 65% by volume of said second powder,
   (D) loosely packing said mixture into a vessel and heating the mixture to a temperature about 700° C. to provide wetting of said inert filler with said electrolyte material,
   (E) crushing the material resulting from heating step D to pass a 20 B.S. sieve and form a free flowing powder,
   (F) charging said free flowing powder of step E into a mold,
   (G) subjecting said powder charge in said mold to pressing at a temperature between about 20 to 30° C. below the temperature of melting of said free flowing powder, and
   (H) removing the resulting pressed body from said mold before said body has cooled to room temperature.

2. A method as claimed in claim 1 wherein said first powder consists of an equi-molar mixture of sodium carbonate and lithium carbonate, said second powder is magnesium oxide and said pressing step G is performed at a temperature about 480° C.

3. The method which comprises subjecting a preformed powder comprising solid active electrolyte material to a compacting operation at a temperature between about 20 to 30° C. below the temperature at which liquid phase would be present in said mixture to form an electrolyte body of the semi-solid type and thereafter using said electrolyte body in an electrochemical cell.

4. An electrolyte body of the semi-solid type prepared by the method of claim 3, wherein said preformed powder consists essentially of material selected from the group consisting of alkali metal salts and alkaline earth metal salts in admixture with inert solid filler material, said filler material constituting 40–75% by weight of said powder.

5. An electrolyte body as claimed in claim 4 wherein said powder consists essentially of a mixture of sodium carbonate, lithium carbonate, potassium carbonate and magnesium oxide.

6. An electrolyte body as claimed in claim 4 wherein said filler material constitutes between 30 to 65 volume percent of said powder.

7. A method as claimed in claim 3 wherein said preformed powder consists essentially of 50% by weight of an equi-molar mixture of sodium carbonate and lithium carbonate and 50% by weight of magnesium oxide.

8. A method of preparing a molded electrolyte body of the semi-solid type for a fuel cell having a density of at least 95% of theoretical which consists essentially of the steps of:

(A) providing a powder mixture comprising solid active electrolyte material and solid filler material, and (B) subjecting said powder mixture to pressure compacting while at a temperature between about 20 to 30° C. below the temperature at which any liquid phase would be present in said mixture.

9. An electrolyte body of the semi-solid type for a fuel cell prepared by the method claimed in claim 8.

References Cited

UNITED STATES PATENTS

| 2,852,591 | 9/1958 | Ruben | 136—153 X |
| 3,120,456 | 2/1964 | Broers | 136—86 |
| 3,146,131 | 8/1964 | Linden et al. | 136—86 |
| 3,147,149 | 9/1964 | Postal | 136—86 |

ALLEN B. CURTIS, *Primary Examiner.*

WINSTON A. DOUGLAS, *Examiner.*